US005424750A

United States Patent [19]

Akisada

[11] Patent Number: 5,424,750

[45] Date of Patent: Jun. 13, 1995

[54] STATIONARY SATELLITE SIGNAL RECEIVING DEVICE

[75] Inventor: Makoto Akisada, Kobe, Japan

[73] Assignee: DX Antenna Company, Limited, Kobe, Japan

[21] Appl. No.: 988,937

[22] PCT Filed: Nov. 11, 1992

[86] PCT No.: PCT/JP92/01471

§ 371 Date: Mar. 9, 1993

§ 102(e) Date: Mar. 9, 1993

[51] Int. Cl.[6] .......... H01Q 3/00; G01S 5/02

[52] U.S. Cl. .......... 342/359; 342/426

[58] Field of Search .......... 342/359, 75, 77, 426

[56] References Cited

U.S. PATENT DOCUMENTS

| | | | |
|---|---|---|---|
| 4,041,496 | 8/1977 | Norris | 342/418 |
| 4,888,592 | 12/1989 | Paik et al. | 342/359 |
| 5,077,561 | 12/1991 | Gorton et al. | 342/359 |

FOREIGN PATENT DOCUMENTS

| | | |
|---|---|---|
| 61-234631 | 10/1986 | Japan . |
| 2125501 | 5/1990 | Japan . |
| 4207206 | 7/1992 | Japan . |

OTHER PUBLICATIONS

Mitsuru Hamano, "Satellite PCM World", Radio Engineering & Electronics Association, No. 165, Mar. 1992, pp. 16-24.

*Primary Examiner*—Gregory C. Issing
*Attorney, Agent, or Firm*—Banner, Birch, McKie & Beckett

[57] ABSTRACT

A device for rotating a parabolic antenna (10) by an actuator (20) to enable reception of electric waves transmitted from a plurality of satellites with the antenna (10). A data for rotating the antenna (10) to enable reception from each satellite at a predetermined receiving position is stored in a ROM (24). A CPU 22 sets the antenna (10) in a position corresponding to the data in the ROM (24) for each satellite different initial receiving from the former for each satellite. From this state, the antenna (10) is moved east and west to detect disappearance of a synchronizing signal which is part of a signal from a tuner (18) by a synchronizing signal detector (50), and the midpoint of the positions of disappearance of the synchronizing signal in the east and west is stored in a RAM (26) as a position of the best receiving condition. The data in the RAM (26) is read out by a control unit (36) and the position of the antenna (10) is changed correspondingly. In response to this positional change, a mark indicative of the satellite moves along the orbit of the satellites displayed on a liquid crystal display together with a map of the receiving region.

2 Claims, 5 Drawing Sheets

STATIONARY SATELLITE SIGNAL RECEIVING DEVICE

TECHNICAL FIELD

This invention relates to a receiving device for receiving broadcasting signals respectively transmitted from a plurality of stationary satellites launched up above the equator, for example.

BACKGROUND OF THE INVENTION

In the case of receiving a broadcasting signal transmitted from a stationary satellite above the equator, it is a general practice to use an antenna for exclusive use in reception of electric waves from satellites, such as a parabolic or plane antenna. In the case of receiving broadcasting signals from a plurality of stationary satellites by a single antenna, it is necessary to have the single antenna track the respective stationary satellites.

For example, Japanese patent opening gasette No. H4-207206 discloses a device for this purpose. This device is provided for receiving electric waves from two satellites launched up above the equator and arranged to adjust the elevation of a parabolic antenna by hand and the azimuth thereof by an actuator so that, at the time of factory shipment, the elevation is adjusted to a value needed for receiving the signals from the respective satellites at a previously known set-up position of the parabolic antenna and, after it is really set up at the set-up position, the azimuth of the parabolic antenna is adjusted by driving the actuator so as to enable reception of the signals from the respective satellites. Adjustment of the azimuth is effected on the basis of data previously set in a control section of the actuator respectively in accordance with an azimuth needed for receiving the electric waves from both satellites at the set-up position.

In the case of using such a device at a position other than the predetermined set-up position, in addition to readjustment of the elevation, it is necessary to newly set in the control section of the actuator such data for adjusting the azimuth as obtained by actually changing the azimuth of the parabolic antenna to seek an azimuth which enables preferable reception of the electric waves from the respective satellites.

The receiving devices of this kind for receiving electric waves from a plurality of satellites include a device which indicates what channel is received from which satellite, as shown especially in Photo. 4 in page 18 of an article entitled "Satellite PCM World" (made by Mitsuru Hamano) inserted in pages 16 to 24 of "DENPA GIJUTSU KYOKAIHO (Radio Engineering & Electronics Association)" Vol. 165 published Mar. 1, 1992 by Japanese foundation of Radio Engineering and Electronics Association, for example. The indication includes the name of each satellite and the name of a specific channel, which is now received, of a plurality of channels transmitted from each satellite.

For example, a number of satellites have been launched above the equator between 69 and 143 degrees of west longitude for U.S. domestic use. Since the U.S. territory is extensive, it is not always possible to receive the signals from all satellites for U.S. domestic use at any receiving position within the United States. The satellites whose signals can be received at a specific receiving position are, limited to a few satellites situated adjacent to each other from east to west in geosynchronous orbit. However, the user of a satellite signal receiving device does not always know the names of both satellites respectively positioned at the eastmost end and westmost end of the receivable range for the position of use of the receiving device and he may intend to receive an electric wave from a particular satellite which is further west than the westmost satellite on the receiving threshold, for example. Accordingly, if the receiving device is provided with a display device for displaying a map including the receiving position and the satellite whose signal is to be received in connection with the map, it is possible to judge whether the particular satellite is a satellite whose signal can be received at the receiving position or not.

An object of this invention is to satisfy setting for receiving electric waves from a plurality of satellites when a receiving device is set up.

Another object of this invention is to enable indication of the position of a satellite whose signal is now received.

SUMMARY OF THE INVENTION

This invention comprises a receiving antenna, driving means for changing the direction of the antenna along a geosynchronous orbit having a plurality of satellites stationary thereto, first memory means for storing a plurality of data to be supplied to the driving means for directing the antenna to the respective satellites at a receiving position; detecting means for detecting direction change of the antenna; means for supplying data corresponding to one of the stationary satellites at a receiving position different from the formerly set receiving position to the driving means; means for supplying instructions for changing the direction of the antenna to one direction and the opposite direction along the stationary orbit until a received signal from the antenna disappears in a state of supply of the data; means for seeking the amounts of change of the direction of the antenna in one direction and the opposite direction until the received signal from the antenna disappears from the state of supply based upon the output of the detecting means; means for correcting the data, corresponding to the stationary satellite, to be supplied to the driving means in accordance with the average of the amounts of change; and means for storing the corrected data.

In the case of correcting the data stored in the first memory means corresponding to another stationary satellite different from the former stationary satellite, when the data in the first memory means corresponding to the other stationary satellite is supplied to the driving means, it can comprise means for correcting the data in the first memory means corresponding to the other stationary satellite based upon the corrected data corresponding to the former stationary satellite.

In another aspect, this invention comprises an antenna for receiving electric waves from a plurality of stationary satellites which are in a stationary orbit, driving means for changing the direction of the antenna along the stationary orbit, memory means for storing a plurality of data to be supplied to the driving means to direct the antenna to the respective stationary satellites, detecting means for detecting direction change of the antenna, means for supplying the data corresponding to one of the stationary satellites to the driving means, display means for displaying a map including the set-up position of the antenna and the orbit, and means for causing the display means to display the stationary satellite on the stationary orbit in accordance with the output of the detecting means varying with the direction change of the antenna based upon the supplied data.

DETAILED DESCRIPTION OF THE INVENTION

Figure 1:
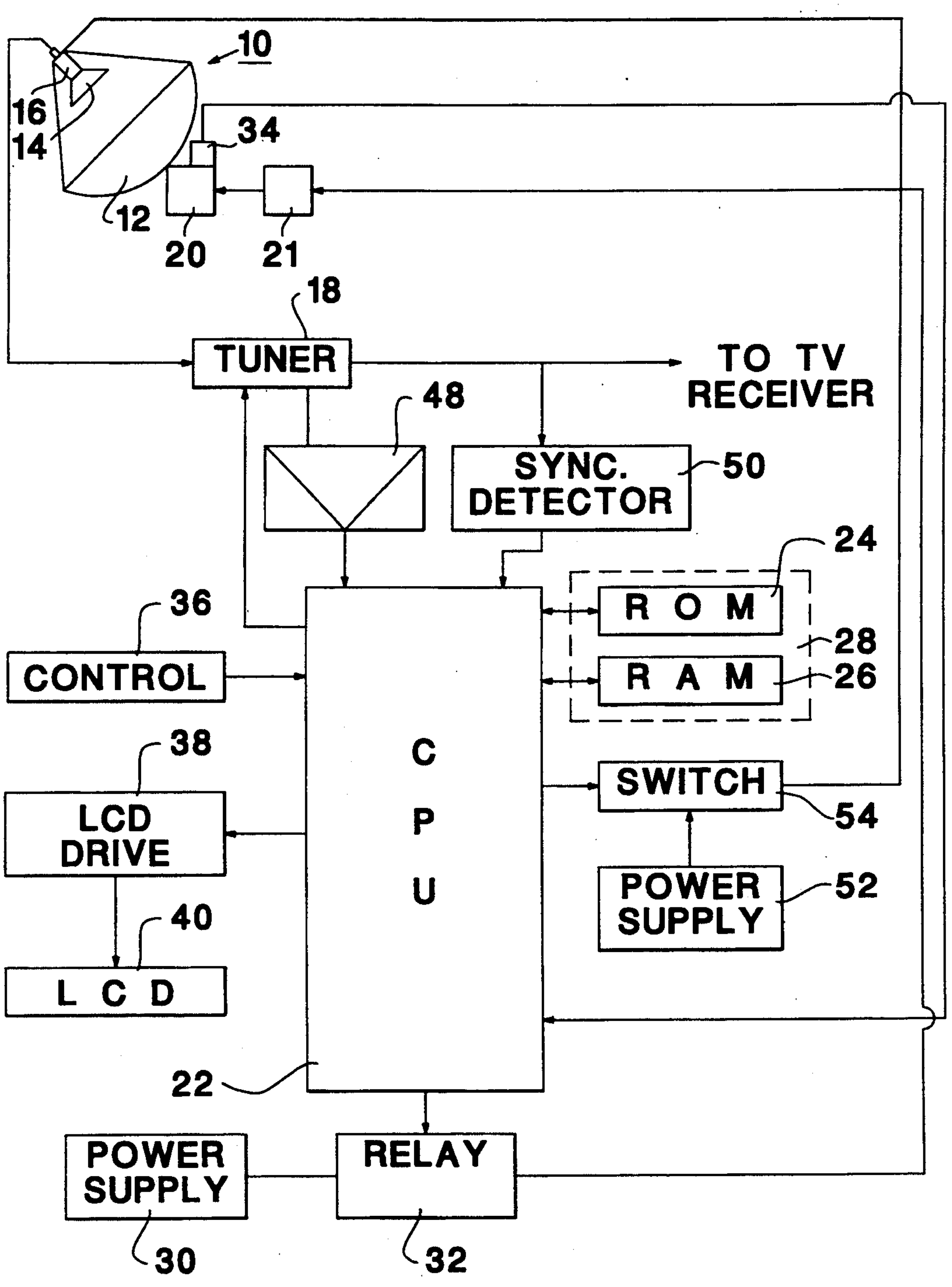
FIG. 1 is a block diagram of an embodiment of the stationary satellite signal receiving device according to this invention.

The stationary satellite signal receiving device of this embodiment is used, for example, for receiving within the United States electric waves transmitted from a plurality of stationary satellites which are in a stationary (geosynchronous) orbit above the equator between 69 and 143 degrees of west longitude for U.S. domestic use.

The embodiment includes a parabolic antenna 10 and the parabolic antenna 10 includes a parabolic reflector 12 and a primary radiator disposed at its focal position. A convertor 16 is disposed behind the primary radiator 14 integrally therewith and the convertor 16 contains a probe (not shown) for receiving an ultra-high frequency signal from a stationary satellite which is received by the parabolic antenna 10 and supplied through the primary radiator 14.

The signal from the probe is converted by the convertor 16 into an intermediate frequency signal of a lower frequency. The intermediate frequency signal from the convertor 16 is supplied, for example, to a tuner 18 disposed indoors and demodulated thereby into a baseband signal for application to a television receiver, not shown.

The parabolic antenna is required to change its direction along the stationary orbit since it is necessary to receive electric waves from a plurality of statonary satellites.

Systems for changing the direction of the parabolic antenna generally include AZ-EL mount, X-Y mount and polar mount systems and the polar mount system is used in this embodiment.

The polar mount system has a polar axis disposed parallel to the earth's axis at a set-up position of the parabolic antenna (signal receiving position); that is, at an inclination to the ground corresponding to the latitude of the signal receiving position, and a declination axis disposed normally to the polar axis. When the elevation of the parabolic antenna is set once in conformity with the declination of the satellites whose signals are to be received by rotating the antenna about the declination axis, the antenna can be directed thereafter to a satellite whose signal is to be received by rotating the antenna about the polar axis.

All the stationary satellites whose signals are to be received by the parabolic antenna 10 are launched up on the equator and, therefore, they are at the same declination. Accordingly, if the declination axis is adjusted once in conformity with the receiving position, it is thereafter possible to direct the parabolic antenna 10 by only adjusting the azimuth of the antenna by rotating it about the polar axis.

The polar mount system includes, for example, an east mount system mainly used in the west coast of the United States, a west mount system mainly used in the east coast and an H-H mount system used all over the United States. Any of these mount systems can be used in this embodiment in accordance with the position at which its device is used.

Whichever mount system is used, the parabolic antenna 10 is provided with an actuator 20 for adjustment of the azimuth of the antenna about the polar axis and the elevation thereof about the declination axis. The actuator 20 stretches and contracts to adjust the azimuth and elevation of the parabolic antenna and is driven by an actuator drive unit 21 including a motor for rotating the actuator.

The actuator drive unit 21 is controlled by a central processing unit (CPU) 22. The CPU 22 includes a memory 28 comprising a read-only memory (ROM) 24 and a random access memory (RAM) 26. The CPU 22 operates in accordance with a program stored in the ROM 24. The CPU 22 controls the actuator drive unit 21 by controlling a relay 32 disposed between the actuator 21 and a power supply 30 therefor. For example, a voltage applied to the actuator drive unit 21 is inverted in polarity between the case of controlling the azimuth about the polar axis to direct the antenna east and the case of directing it west.

The actuator drive unit 21, the actuator 20 is provided with a pulse generator 34 for generating a pulse signal every time the actuator 20 stretches by a predetermined length, especially, and the pulse signal from the pulse generator 34 is supplied to the CPU 22.

While the number of satellites whose signals can be received at a certain receiving position in the United States is limited, in order to receive the signals from all the receivable signal transmitting satellites, the RAM 26 stores data for adjustment of the azimuth about the polar axis for each satellite. The process of preparation of the data will be described below.

In a state wherein the azimuth has been adjusted about the declination axis as needed for receiving the signals of the respective satellites in accordance with the receiving position, some of the data in the RAM 26 is selected by an operation of a control unit 36 in accordance with a user's request and, in accordance with this selection, the CPU 22 controls a relay 32 to direct the antenna 10 to a requested satellite.

Figure 5:
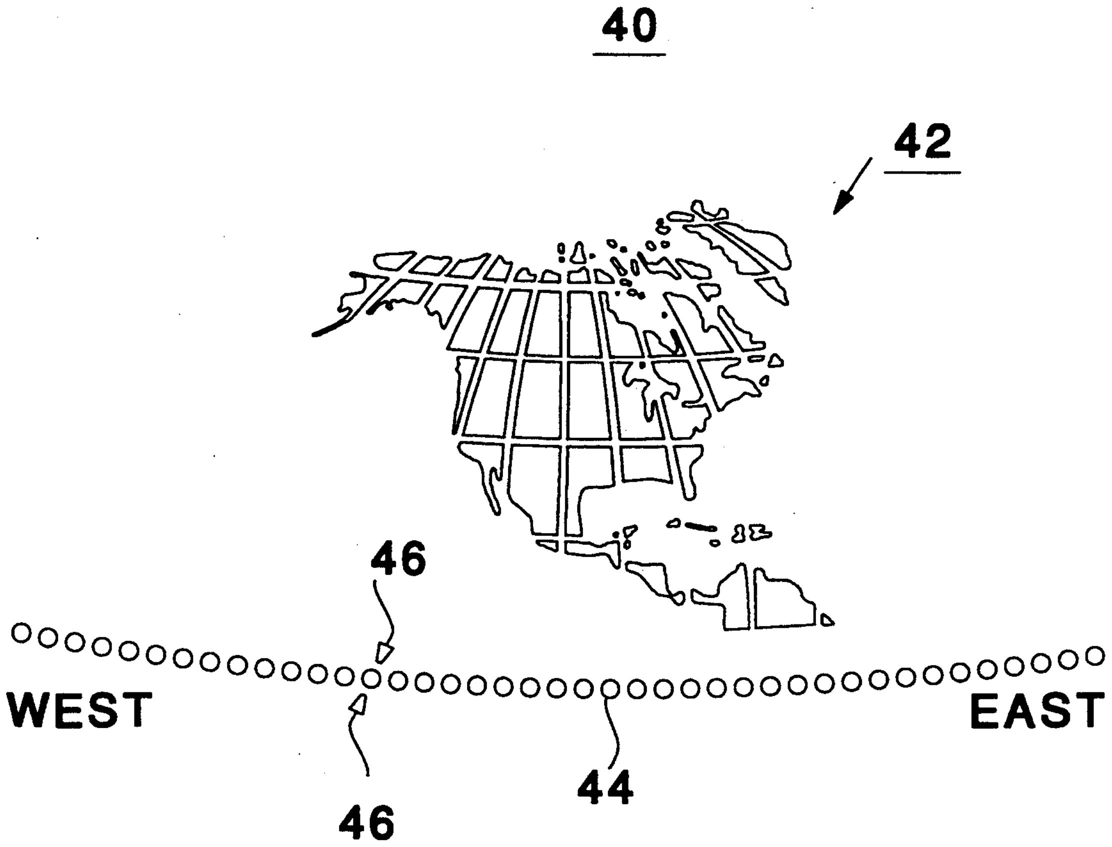
FIG. 5 is a diagram showing a display of a display device of this embodiment.

The CPU 22 is provided with a liquid crystal display 40 controlled by a liquid crystal display drive unit 38 and the liquid crystal display 40 displays a map 42 schematically showing the mainland of the United States as shown in FIG. 5 based upon the data stored in the ROM 24, for example.

Satellite marks. 46 are displayed above and below one of equator marks 44 at a position corresponding to the launched position of the satellite whose signal is now received.

Accordingly, if the direction of the parabolic antenna 10 is changed from the state of receiving an+electric wave from a certain satellite to the state of receiving an electric wave from another satellite, the display position of the satellite marks is changed correspondingly.

RAM data stored in the RAM 26 are obtained by seeking the azimuths according to the receiving points based upon the ROM data previously stored in the ROM 24. The ROM data are numerical values required for receiving the signals from the respective satellites at a position of 100 degrees west longitude and 40 degrees north latitude, for example, which is selected as a central position of the mainland of the United States, and calculated by dividing into five thousand divisions the azimuth range of the parabolic antenna 10 needed from the state of receiving the electric wave from the satellite at 69 degrees west longitude with adjustment of the azimuth of the antenna about the polar axis to the state of receiving the electric wave from the satellite at 143 degrees west longitude with readjustment thereof about the polar axis in such a state in that the polar axis of the mount is disposed parallel to the earth's axis at the above-mentioned position and the elevation of the antenna is adjusted about the declination axis in conformity with the receiving position.

The ROM data are previously prepared in three kinds corresponding respectively to the west, east and H—H mounts so that any of the three types of mount may be used in the parabolic antenna 10.

When the electric signal from any satellite is received at a receiving position different from the above-mentioned central point, its azimuth is sought based upon these data and its value is stored in order to seek the azimuth, the control signal used in the tuner 18 for automatic gain control is amplified by an amplifier 48 and then supplied to the CPU 22. For the same purpose, a synchronizing signal is detected by a detector 50 from the baseband signal supplied from the tuner 18 to the television receiver and supplied the CPU 22.

While the parabolic antenna 10 is rotated as described below for seeking the azimuth based upon the ROM data, the probe in the convertor 16 may come out of the plane of polarization of the electric wave from the satellite. To this end, the convertor 16 is provided with a polarotor. The polarotor serves to change the position of the probe by a motor and has a power supply 52 for controlling the motor and a switch 54 for converting voltage from the power supply 52 into a pulse signal and supplying it to the motor. The switch 54 is controlled by the CPU 22. As the polarotor, what is disclosed, for example, in the Japanese patent opening gazette No. H2-125501 may be used.

In order to utilize in the case of seeking the azimuth based upon the ROM data, when a plurality of electric waves different in frequency are transmitted from a single satellite, the CPU 22 supplies a selection signal to the tuner 18 so that the tuner 18 changes the demodulated signal into any one of these electric waves. Moreover, the CPU 22 can drive the actuator 20 in accordance with control from a control unit 36.

Figure 2:
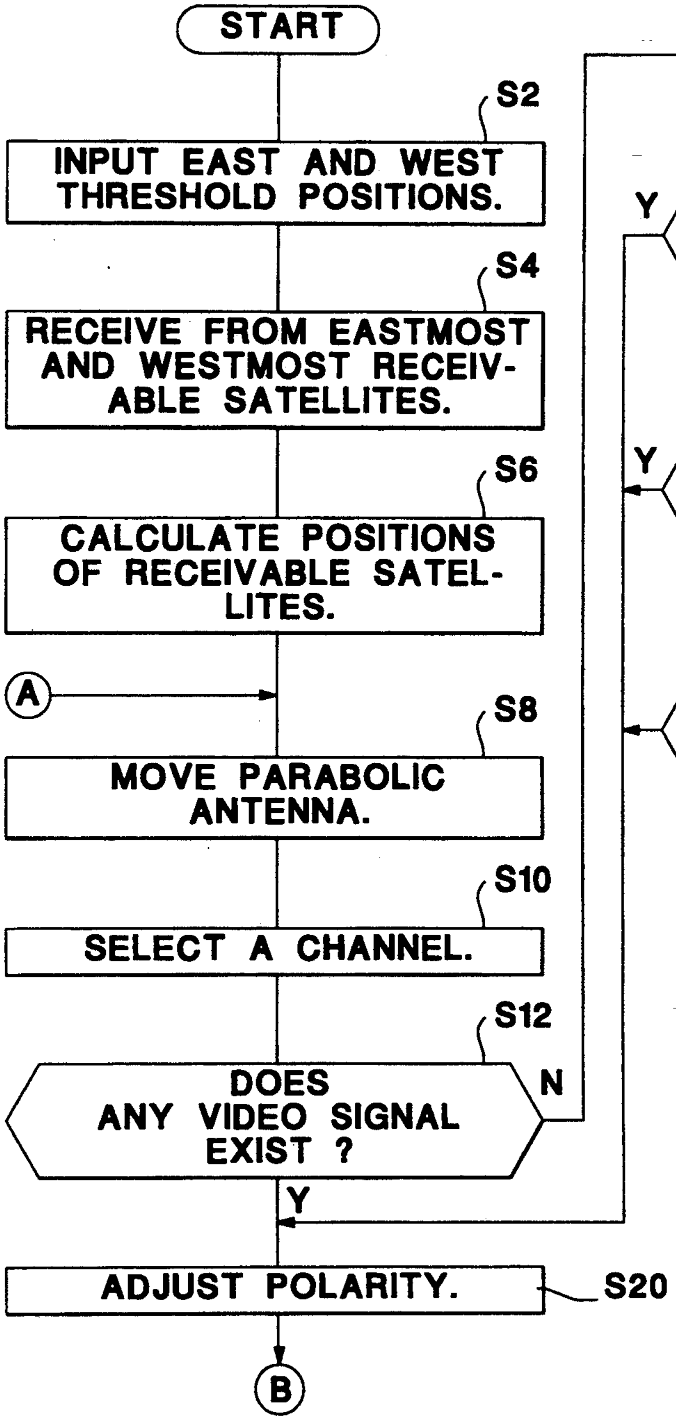
FIG. 2 shows part of a flow chart representing an operation executed by a central processing unit used in this embodiment.
Figure 3:
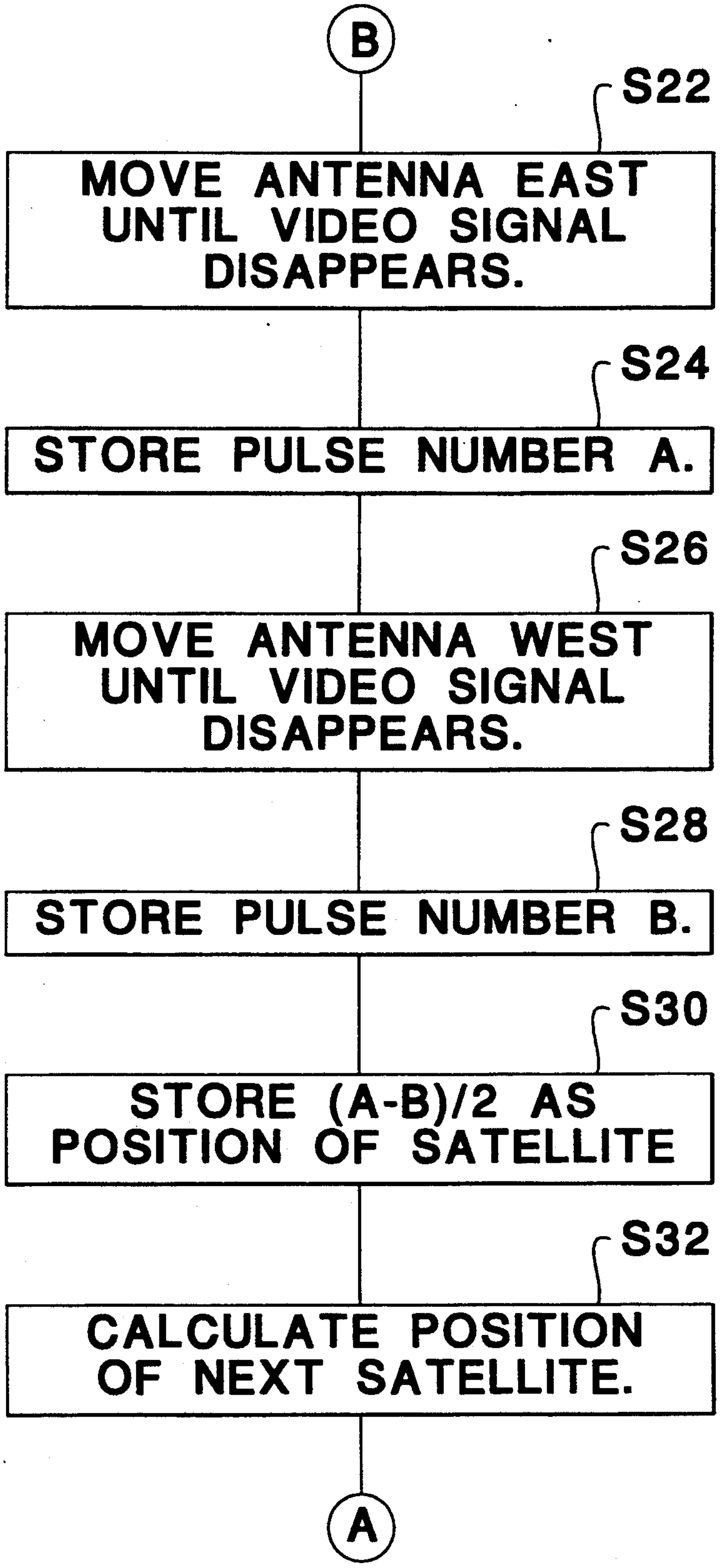
FIG. 3 shows another part of the flow chart representing the operation executed by the central processing unit used in this embodiment.

Now, the description will be made on a method of seeking the azimuth of a satellite executed by the CPU 22 based upon the ROM data with reference to the flow charts shown in FIGS. 2 and 3. First of all, the polar axis of the parabolic antenna is disposed parallel to the earth's axis at the receiving position and the elevation is adjusted about the declination axis so that the parabolic antenna 10 is directed to the equator in accordance with the receiving position.

Then, the azimuth angles which cannot be exceeded east and west by the parabolic antenna 10 at the receiving position are set in the CPU 22 by the control unit 36 (step S2). Both these azimuth angles are such angles that the parabolic antenna 10 cannot be turned more east and west due to structural limitation of the actuator 20.

In the next step (step S4), the parabolic antenna 10 is actually directed by control from the control unit 36 to the positions of the eastmost and westmost satellites between the above-mentioned east and west azimuth angles, that is, the eastmost and westmost satellites whose signal can be received at the receiving position. Then, starting to count the number of pulses generated by the pulse generator 34 from the west threshold direction of the parabolic antenna, the count at the time of direction to the westmost receivable satellite and the count at the time of direction to the eastmost receivable satellite are stored.

The amounts of rotation of the parabolic antenna 10 for directing it to the above-mentioned eastmost and westmost satellites and the satellites therebetween with reference to the azimuth position of the westmost satellite for receiving the signals of these satallite are calculated (step S6). The calculation is effected as follows, for example. Assuming WDP as the number of pulses generated by the pulse generator 34 in correspondence to the westmost receivable satellite, EDP as the number of pulses generated by the pulse generator 34 in correspondence to the eastmost receivable satellite, WRC as the ROM data of the westmost receivable satellite, ERC as the ROM data of the eastmost receivable satellite and W2ERC as the ROM data of the second satellite from the westmost receivable satellite, the number of pulses W2DP for receiving the signal from the second satellite at the receiving position is calculated as follows.

$$W2DP = WDP + (W2ERC - WRC)(WDP - EDP)/(WRC - ERC)$$

Similarly, the count W3DP corresponding to the ROM data for receiving the signal from the third satellite is sought as follows.

$$W3DP = W2DP + (W3ERC - W2ERC)(WDP - EDP)/(WRC - ERC)$$

And so on, the counts for the other satellites are calculated, similarly. The ROM data used here are selected from the ROM 24 in accordance with the mount of the parabolic antenna 10.

Thereafter, the parabolic antenna 10 is moved (step S8). The movement is made initially from the receiving state of the westmost receivable satellite to the receiving state of the electric wave of the second satellite from the westmost receivable satellite. This is done by rotating the parabolic antenna 10 from the receiving state of the westmost receivable satellite until the pulse signals are generated by the difference between W2DP and WDP and the pulses generated by the pulse generator 34 from the position at which the parabolic antenna 10 is directed to the westmost direction are counted by the CPU 22.

In the next step (step S10), the CPU 22 supplies a selection signal to the tuner 18, in the state wherein the parabolic antenna 10 is directed to the position of the second satellite from the westmost receivable satellite, for example, so that one of the electric waves transmitted from this satellite, for example, an electric wave in a non-scrambled frequency band (channel) is received.

In this state, it is judged whether any video signal exists or not (step S12). This judgement is effected in accordance with detection of the synchronizing signal in the synchronizing signal detector 50.

If no video signal is detected (if the judgement in step 12 is NO), it is judged whether or not a video signal exists upon changing the channels successively (step S14).

If no video signal exists, it is judged whether or not a video signal exists or while the parabolic antenna 10 is rotated east until a predetermined number of pulses are generated by the pulse generator 34 (step S16).

If no video signal exists even then, it is judged whether the video signal exists while the parabolic antenna 10 is rotated west by a predetermined number of pulses by the pulse generator 34 (step S18).

If no satellite wave can be received even then, it is judged as unreceivable and the step S8 is executed for receiving the electric wave from the next satellite.

Both of the above-mentioned predetermined numbers of pulses are such threshold numbers of pulses that no electric wave is received from any adjoining satellite even if the parabolic antenna 10 is directed east or west from these numbers. For example, if it is considered that the parabolic antenna is directed to the adjoining satellite when it is rotated until the pulse generator 34 generates newly twelve pulses, it is set to eight pulses.

Then, if the video signal is found in step S12 (the judgement in step S12 is YES), if the video signal is found during the channel change in step S14 (the judgement in step S12 is YES), if the video signal is found during the eastward movement in step S16 (the judgement in step S16 is YES) or if the video signal is found during the westward movement in step S18 (the judgement in step S18 is YES), polarity adjustment is effected (step S20).

More particularly, the motor for polarity adjustment is controlled by controlling the switch 54 to gradually change the position of the probe as described above and, when the AGC signal supplied from the amplifier 48 to the CPU 22 becomes minimum or when the satellite signal level in the tuner 18 becomes maximum, the control condition of the switch 54 is stored. The stored value is actually read out when the signal from this satellite is received and used to put the probe in the condition for making the satellite signal level in the tuner 18 maximum.

If the video signal is found as above, the parabolic antenna 10 is rotated east from its present position until the video signal disappears (until no synchronizing signal can be detected by the synchronizing signal detector 50) (step S22). The pulses generated from the pulse generator 34 with this rotation are counted and this count A ($A=\alpha+\beta$, if the count at the present position of the parabolic antenna 10 is $\alpha$, for example, and the pulse generator 34 generates thereafter $\beta$ pulses, for example) is stored (step S24).

Then, the parabolic antenna 10 is rotated west until the video signal disappears (step S26) and the count B of the pulses generated by the pulse generator 34 ($B=A-\gamma$, if the pulse generator 34 generates $\gamma$ pulses after the count A at the time of disappearance of the video signal with the above-mentioned eastward movement, for example) are stored.

Next, the value of (A-B)/2 is calculated and stored in the RAM 26 as a RAM data which shows the best point for receiving the signal from the satellite for which the adjustment is now effected at the present receiving position (step S30).

Then, calculation is effected for directing the parabolic antenna 10 to the next satellite (step S32). More particularly, the difference between the values calculated respectively in step S22 for directing the parabolic antenna 10 to the above-mentioned satellite and to the satellite adjoining it in the east is calculated and added to the above-mentioned stored value. The step S24 is executed in accordance with this sum and, similarly, the amounts of rotation of the parabolic antenna 10 for obtaining the best condition of reception from the other satellites are calculated and stored in the RAM 26.

Since the RAM data are stored in the RAM 26 in this manner, the amount of movement of the parabolic antenna 10 for obtaining the best condition of reception from each satellite can be automatically provided. Therefore, such a troublesome labor as receiving the electric wave from each satellite, manually adjusting to obtain the best condition of reception and storing each amount of movement of the parabolic antenna 10 corresponding the best receiving condition in the RAM 26 is significantly reduced.

By using the above-mentioned RAM data, it is possible to receive the electric wave from each satellite in the best condition and, at the same time, to display the satellite marks 46 indicative of the satellite under reception on the equator mark 44 of the display 40.

Figure 4:
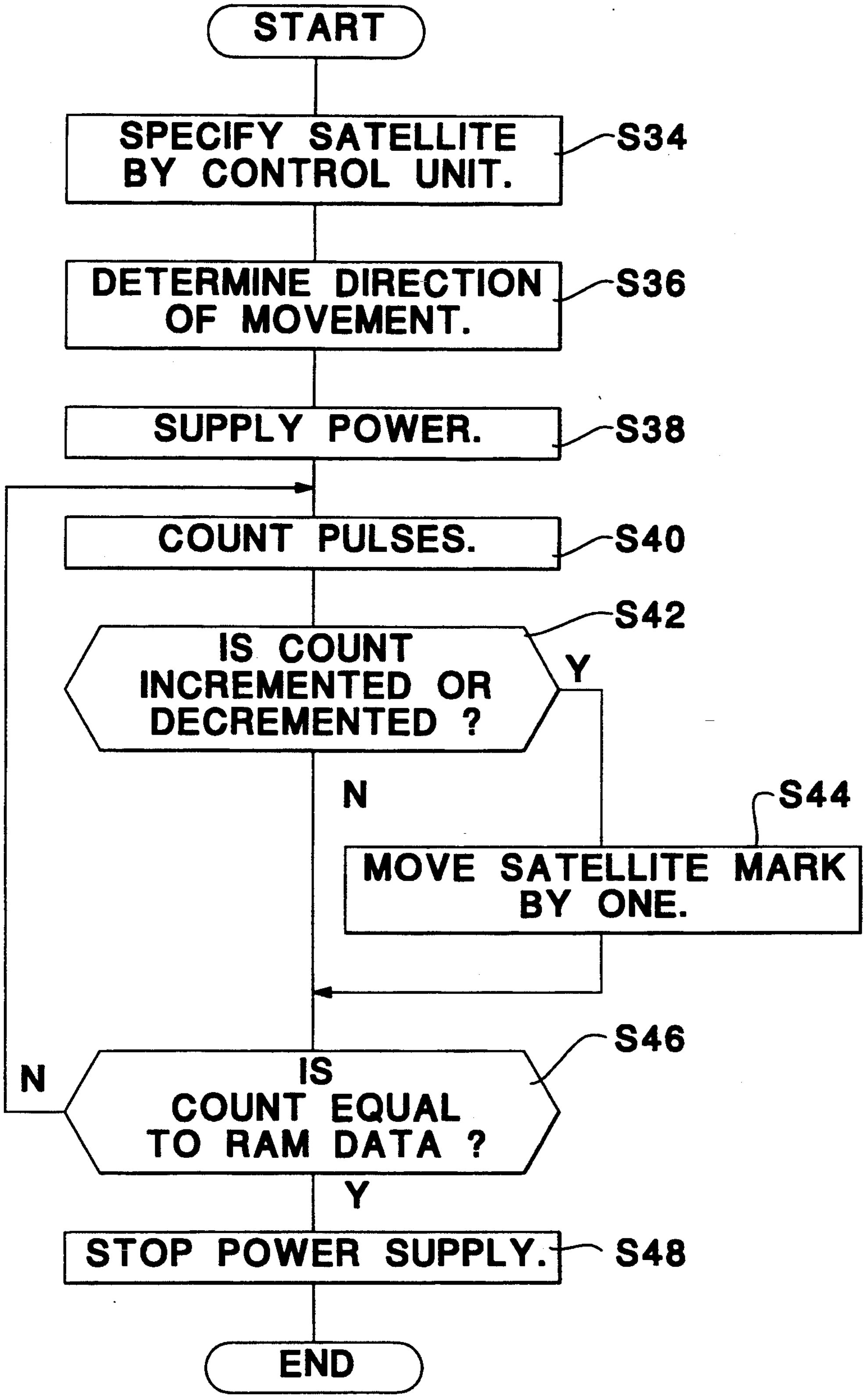
FIG. 4 shows the remaining part of the flow chart representing the operation executed by the central processing unit used in this embodiment.

Now, the description will be made on the control effected by the CPU 22 for this purpose with reference to the flow chart as shown in FIG. 4.

A satellite whose signal is to be received is first specified by operating the control unit 36 (step S34). Then, the CPU 22 reads out the RAM data of the specified satellite from the RAM 26 and calculates its difference from the RAM data of the satellite under reception, thereby determining the direction of movement of the parabolic antenna 10 either eastward or westward (step S36). The relay 32 is controlled for applying a voltage of a polarity for directing the parabolic antenna 10 to the determined direction to the power supply 30 (step S38). Namely, power supply is effected.

Thus, the antenna 10 commences azimuth change and the pulse generator 34 begins to generate pulse signals in response thereto.

The pulse signals are counted by the CPU 22 (step S40). This counting operation is effected by incrementing or decrementing the count by one every time the pulse signal is generated from the state wherein the RAM data corresponding to the satellite under reception are preset. Either increment or decrement is selected in accordance with the result of judgement in step S36.

It is judged whether the count is incremented or decremented by a predetermined count (step S42). As an example, assuming that the RAM data corresponding to the westmost satellite whose signal can be received at the receiving position is 5 and the RAM data corresponding to the eastmost satellite whose signal can be received at the receiving position is 305 and that the geosynchronous orbit position of the satellite corresponding to the RAM data 0 is the 10-th from the left end of the equator marks 44 in FIG. 5 and the position of the equator mark corresponding to the eastmost satellite is the 40-th from the left end, each equator mark 44 corresponds to three RAM data. In this case, therefore, the predetermined count should be 10. Accordingly, the predetermined count is determined in accordance with the difference between the RAM data of the westmost and eastmost satellites whose signals can be received at the receiving position and the number of equator marks 44 corresponding to the interval between the positions of both satellites. The base point of indication of the satellite marks 46 is the equator mark 44 corresponding to the launching position of the westmost satellite. In the above example, therefore, the satellite marks 46 may move by one equator mark with increment of the count by 10.

If the count is incremented or decremented by the predetermined count in step S42, the satellite marks 46 displayed at the position of the satellite under reception are moved east or west by one in accordance with increment or decrement of the count (step S44).

Succeeding thereto, or if it is judged in step S42 that the count is not incremented or decremented by the predetermined count, it is judged whether the count is equal to the RAM data specified by the control unit 36 or not (step S46) and, if it is equal (the judgement in step 46 is YES), the relay 32 is controlled to stop power supply to the actuator drive unit 21 (step S48). If not (the judgement in step S46 is NO), the step 40 is resumed and the step, S40, S42, S44 and S46 are repeated until the judgement in step S46 becomes YES.

At the time of completion of the step 48, therefore, the parabolic antenna 10 is directed to the satellite specified by the control unit 36 and the position of the specified satellite is indicated with the satellite marks 46 in the display 40.

Since the position of the satellite marks 46 is changed with change of the satellite for reception, it is possible to know the position of the changed satellite is geosynchronous orbit and also immediately know how far the satellite,-whose signal is newly received is apart from the satellite whose signal was received previously While the polar mount is used for the antenna mount in the above embodiment, the other mounts may be used. While the above embodiment is described in the case of using it in the United States, it may be used also in the European countries in similar fashion. In this case, however, the map displayed by the display 40 must be changed.

INDUSTRIAL UTILIZABILITY

As described above, according to the stationary satellite signal receiving device according to this invention, even in the case of receiving electric waves from a plurality of satellites at various receiving positions, it can be set automatically to enable reception from any satellite at any position in the best condition. Moreover, it is possible to indicate the position of the satellite under reception relative to the other satellites in geosynchronous orbit, even at the time of redirecting the antenna for reception from another satellite.

I claim:

1. A device for receiving a television broadcast signal, at an arbitrary receiving spot on earth, from a plurality of satellites which are in a geosynchronous orbit, comprising:

an antenna located at the arbitrary receiving spot for receiving said broadcast signal, said antenna having an axis of rotation disposed in parallel with an axis of the earth;

means for detecting a video synchronizing signal from said broadcast signal;

means for detecting angles of rotation of said antenna about said axis of rotation relative to a predetermined rotational position of said antenna;

first memory means for storing positional data for directing an antenna located at a predetermined receiving spot to each of said satellites;

driving means for rotating said antenna about said axis of rotation;

means for calculating, from said positional data, angle of rotation data corresponding to each of said satellites, said angle of rotation data including first data corresponding to a first satellite and second data corresponding to a second satellite;

selecting means for selecting data and for supplying the selected data to said driving means to cause said driving means to rotate said antenna to a position where said synchronizing signal is detected, said selecting means selecting said first data to rotate said antenna to an initial first position;

correcting means (i) for causing said antenna to be rotated about said axis of rotation initially in a first direction and then subsequently in a second direction respectively from said initial first position, said antenna being rotated in the first and second directions until said synchronizing signal disappears to define first and second subsequent positions respectively, (ii) for calculating an average of the angles of rotation of said antenna corresponding to said first and second subsequent positions, and (iii) for determining a correction to correct said first data in accordance with said calculated average angle;

second memory means for storing said correction; and means (i) for determining a difference between said first and second data, (ii) for adding said difference to said correction to determine resultant data, (iii) for storing said resultant data in said second memory means as corrected second data, and (iv) for repeating an operation of said selecting means based on said corrected second data being used in place of said first data to rotate said antenna to a corrected second position.

2. The device according to claims 1, further comprising:

means for displaying a map including said receiving spot and depiction of the geosynchronous orbit of each of said stationary satellites;

means for reading said resultant data from said second memory means and supplying said resultant data to said driving means; and means for causing an indication of change of a direction of said antenna to be displayed on said means for displaying along said displayed geosynchronous orbit until an angle of rotation of said antenna which has been detected by said means for detecting angles of rotation becomes equal to said resultant data from said second memory means.

* * * * *